(12) United States Patent  (10) Patent No.: US 7,649,735 B2
Iwaki  (45) Date of Patent: Jan. 19, 2010

(54) INFORMATION PROCESSING APPARATUS AND VIDEO SIGNAL OUTPUT CONTROL METHOD

(75) Inventor: Tsutomu Iwaki, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 379 days.

(21) Appl. No.: 11/485,365

(22) Filed: Jul. 13, 2006

(65) Prior Publication Data

US 2007/0112989 A1   May 17, 2007

(30) Foreign Application Priority Data

Jul. 13, 2005   (JP) ............... 2005-204542

(51) Int. Cl.
*G06F 1/16*   (2006.01)
(52) U.S. Cl. ............. 361/679.41; 710/303; 370/395.64; 250/492.1; 455/411
(58) Field of Classification Search ............ 370/395.64, 370/465, 539; 429/13, 22; 361/681–683, 361/724–727; 455/411, 575.3; 712/217; 710/303; 250/370.09, 492.1
See application file for complete search history.

(56) References Cited

U.S. PATENT DOCUMENTS

| 5,218,432 A | 6/1993 | Wakeland |
| 5,587,744 A | 12/1996 | Tanaka |
| 5,760,760 A | 6/1998 | Helms |
| 5,943,064 A | 8/1999 | Hong |
| 6,002,446 A | 12/1999 | Eglit |
| 6,108,047 A | 8/2000 | Chen |
| 6,208,326 B1 | 3/2001 | Frederick et al. |
| 6,317,164 B1 | 11/2001 | Hrusecky et al. |
| 6,411,306 B1 | 6/2002 | Miller et al. |
| 6,600,747 B1 * | 7/2003 | Sauber .................. 370/395.64 |
| 6,784,941 B1 | 8/2004 | Sue et al. |
| 6,798,420 B1 | 9/2004 | Xie |
| 6,839,094 B2 | 1/2005 | Tang et al. |
| 6,839,903 B1 | 1/2005 | Shintani et al. |
| 7,030,934 B2 | 4/2006 | Shy et al. |
| 7,106,383 B2 | 9/2006 | Kahn |
| 7,206,027 B2 | 4/2007 | De Haan et al. |
| 7,224,401 B2 | 5/2007 | Ackley et al. |
| 7,248,303 B2 | 7/2007 | Iwaki |
| 7,304,685 B2 | 12/2007 | Park et al. |

(Continued)

FOREIGN PATENT DOCUMENTS

CN   1186269   7/1998

(Continued)

OTHER PUBLICATIONS

Chinese Office Action dated Jun. 13, 2008 for Appln. No. 2006101057144.

(Continued)

*Primary Examiner*—Hung V Duong
(74) *Attorney, Agent, or Firm*—Pillsbury Winthrop Shaw Pittman, LLP

(57) ABSTRACT

A video signal output control method in an information processing apparatus which being to be locked to an external unit by a lock mechanism, the video signal output control method includes detecting the state of the lock mechanism, and stopping the output of the video signal to the external unit, when the lock mechanism is in the unlocked state.

14 Claims, 9 Drawing Sheets

U.S. PATENT DOCUMENTS

| | | |
|---|---|---|
| 2002/0057281 A1 | 5/2002 | Moroo et al. |
| 2002/0122046 A1 | 9/2002 | Dischert et al. |
| 2002/0145610 A1 | 10/2002 | Barilovits et al. |
| 2003/0038823 A1 | 2/2003 | Pasqualini et al. |
| 2003/0142085 A1 | 7/2003 | Taniguchi et al. |
| 2004/0075769 A1 | 4/2004 | Shy et al. |
| 2004/0223058 A1 | 11/2004 | Richter et al. |
| 2004/0233997 A1 | 11/2004 | Umesako |
| 2005/0018077 A1 | 1/2005 | De Haan et al. |
| 2005/0027994 A1 | 2/2005 | Sai |
| 2005/0062891 A1 | 3/2005 | Tang et al. |
| 2005/0262445 A1 | 11/2005 | Kizaki et al. |
| 2005/0268236 A1 | 12/2005 | Kosaka |
| 2006/0012714 A1 | 1/2006 | Louie et al. |
| 2006/0017852 A1 | 1/2006 | Iwaki |
| 2006/0023121 A1 | 2/2006 | Obara et al. |
| 2006/0056716 A1 | 3/2006 | Komeno |
| 2006/0066507 A1 | 3/2006 | Yanagisawa |
| 2006/0066639 A1 | 3/2006 | Iwaki |
| 2006/0085145 A1 | 4/2006 | Matsuoka et al. |
| 2006/0181645 A1 | 8/2006 | Sarika |
| 2006/0187361 A1 | 8/2006 | Fujine et al. |
| 2007/0015018 A1* | 1/2007 | Tsutsui ............... 429/22 |
| 2007/0097402 A1 | 5/2007 | Chen |
| 2007/0129882 A1 | 6/2007 | Sano et al. |
| 2007/0211167 A1 | 9/2007 | Adams et al. |

FOREIGN PATENT DOCUMENTS

| | | |
|---|---|---|
| CN | 1578458 | 2/2005 |
| JP | 2002-312155 | 10/2002 |
| JP | 2002-314970 | 10/2002 |
| JP | 2004-336178 | 11/2004 |
| JP | 2005-051558 | 2/2005 |

OTHER PUBLICATIONS

Japanese Office Action dated Jun. 24, 2008 for Appln. No. 2005-204542.

* cited by examiner

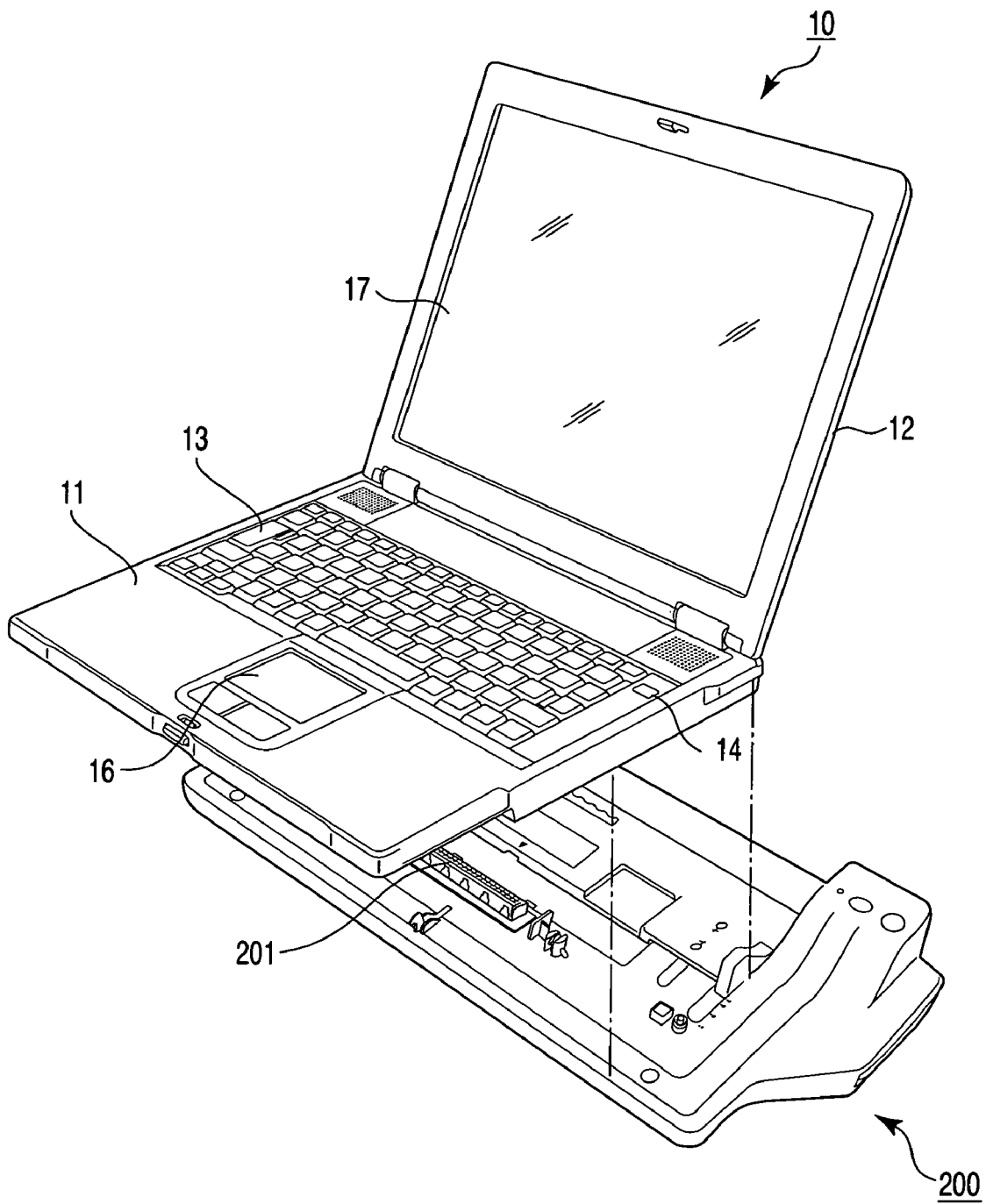
F I G. 1

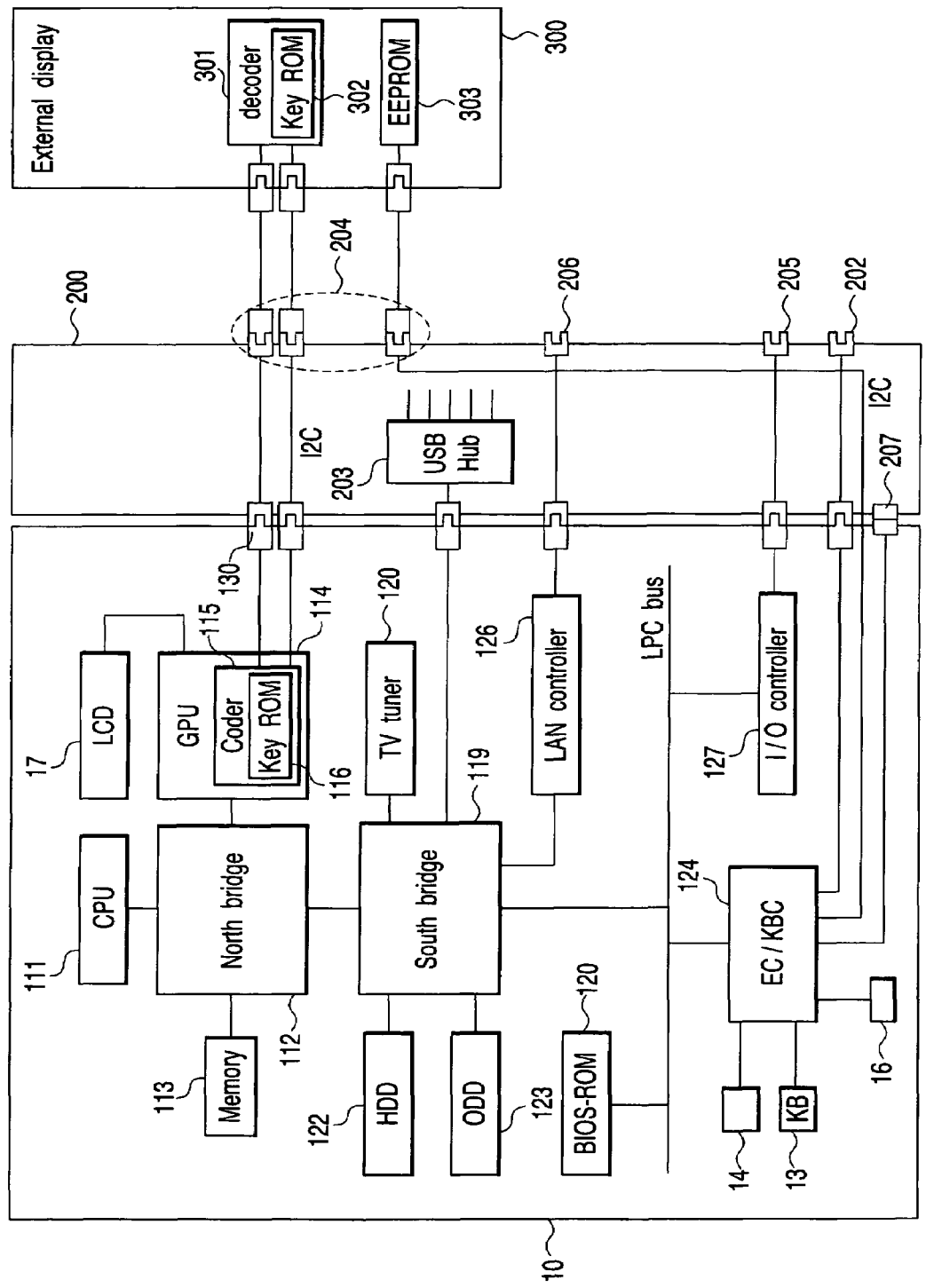
F I G. 5

INFORMATION PROCESSING APPARATUS AND VIDEO SIGNAL OUTPUT CONTROL METHOD

CROSS-REFERENCE TO RELATED APPLICATIONS

This application is based upon and claims the benefit of priority from Japanese Patent Application No. 2005-204542, filed Jul. 13, 2005, the entire contents of which are incorporated herein by reference.

BACKGROUND

1. Field

This invention relates to an information processing apparatus capable of outputting an encrypted digital video signal and a video signal output control method.

2. Description of the Related Art

Presently, digital broadcasting is becoming mainstream in place of analog broadcasting. Digital-signal-recorded sources, such as DVDs, have been used. With the transition from analog to digital broadcasting, it is conceivable that digital signals will be output directly to a TV set.

In the case of digital output, since use of high-quality video content is possible, it is necessary to strengthen copyright protection to prevent provided video content from being reproduced in an unauthorized manner or copied illegally. As digital content protection techniques, the HDCP (High-bandwidth Digital Content Protection System) standard has been proposed.

The HDCP standard is a standard for transferring the video content requiring copyright protection safely in a digital video signal transmission system. The HDCP standard prescribes specifications for authentication between the transmitting unit and the receiving unit, the sharing of a key for authentication, the encryption of video signals to be transmitted, and others.

In authentication in the HDCP standard or the like, a device key for authenticating the other party's device individually by public key encryption is used. If authentication is successful between the transmitting unit and the receiving unit, the transmitting unit encrypts the video signal using the device key and transmits the encrypted signal. The receiving unit decrypts the received video signal using the device key. For example, a digital image transmitting apparatus using an authentication method complying with the HDCP standard or the like has been disclosed in Jpn. Pat. Appln. KOKAI Publication No. 2002-314970.

When a notebook personal computer is used as an information output apparatus, use of a docking station can be considered in order to output a signal to a TV set. In a state where the personal computer is installed on the docking station and the encrypted video signal is output to the TV set, suppose the personal computer (or an information processing apparatus) is removed from the docking station (or an external unit). In this case, there is a possibility that the personal computer will kept outputting the video signal.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary view showing a notebook personal computer as an information processing apparatus according to an embodiment of the present invention and a docking station as an external unit;

FIG. 5 is an exemplary view showing a system configuration of the computer, docking station, and external display;

DETAILED DESCRIPTION

Figure 2:
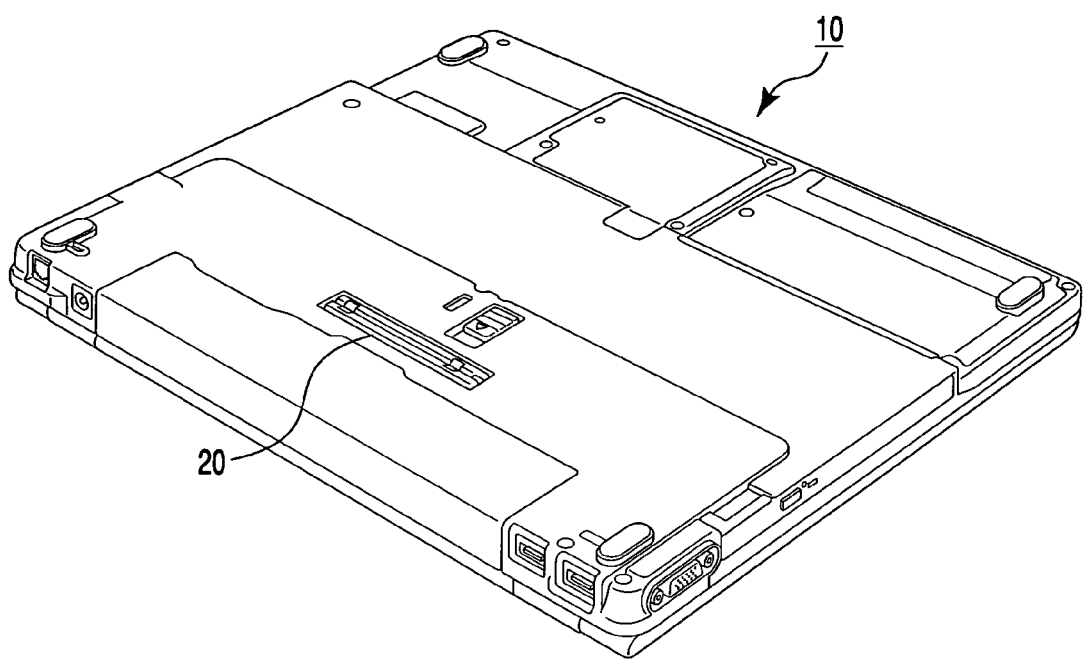
FIG. 2 is an exemplary perspective view of the back side of the computer.

Various embodiments according to the invention will be described hereinafter with reference to the accompanying drawings. In general, according to one embodiment of the invention, an information processing apparatus comprises a body which being to be locked to an external unit by a lock mechanism, a display controller which is provided in the body and generates a video signal, a control section which stops outputting the video signal generated by the display controller to the external unit, when the lock mechanism is in the unlocked state.

First, referring to FIGS. 1 and 2, the configuration of an information processing apparatus according to an embodiment of the present invention will be explained. The information processing apparatus is realized in the form of a battery-powered portable notebook personal computer 10.

FIG. 1 is a perspective view of the notebook personal computer with its display unit opened and a docking station serving as an extended unit. FIG. 2 is a perspective view of the back side of the computer.

The computer 10 comprises a computer body 11 and a display unit 12. A display device composed of an LCD (Liquid Crystal Display) 17 is incorporated in the display unit 12. The display screen of the LCD 17 is positioned almost in the center of the display unit 12.

The display unit 12 is provided on the computer body 11 so as to be capable of rotating freely between the opened position and the closed position. The computer body 11 has a thin box-like enclosure. On its top, there are provided a keyboard 13, a power button 14 for turning on/off the power supply of the computer 10, and a touch pad 16.

When the computer 10 is installed on a docking station 200 serving as an external unit, a docking connector 201 provided on the docking station 200 connects with a docking port 20 provided on the back side of the computer 10 shown in FIG. 2, which enables signals to be transmitted.

Figure 3:
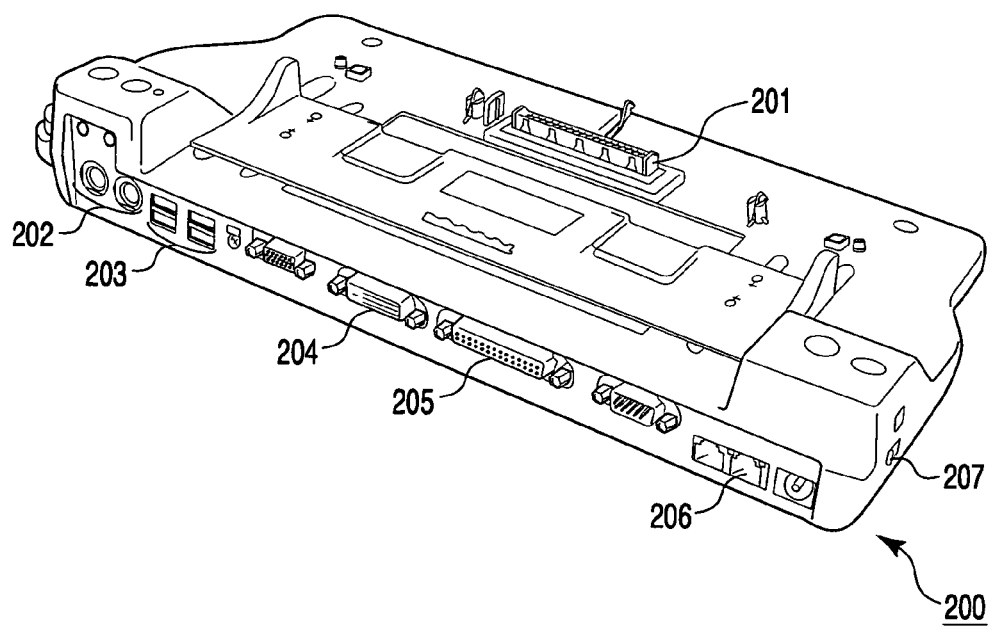
FIG. 3 is an exemplary perspective view showing a configuration of the back side of the docking station.

FIG. 3 shows a configuration of the back side of the docking station 200. As shown in FIG. 3, the docking station 200 includes a PS/2 connector 202, a USB (Universal Serial Bus) connector 203, a DVI (Digital Visual Interface) connector 204, a parallel connector 205, a LAN connector 206, and a lock mechanism 207. When the computer 10 is installed on the docking station 200, the computer 10 can be locked to the docking station 200 by operating the lock mechanism 207.

Figure 4:
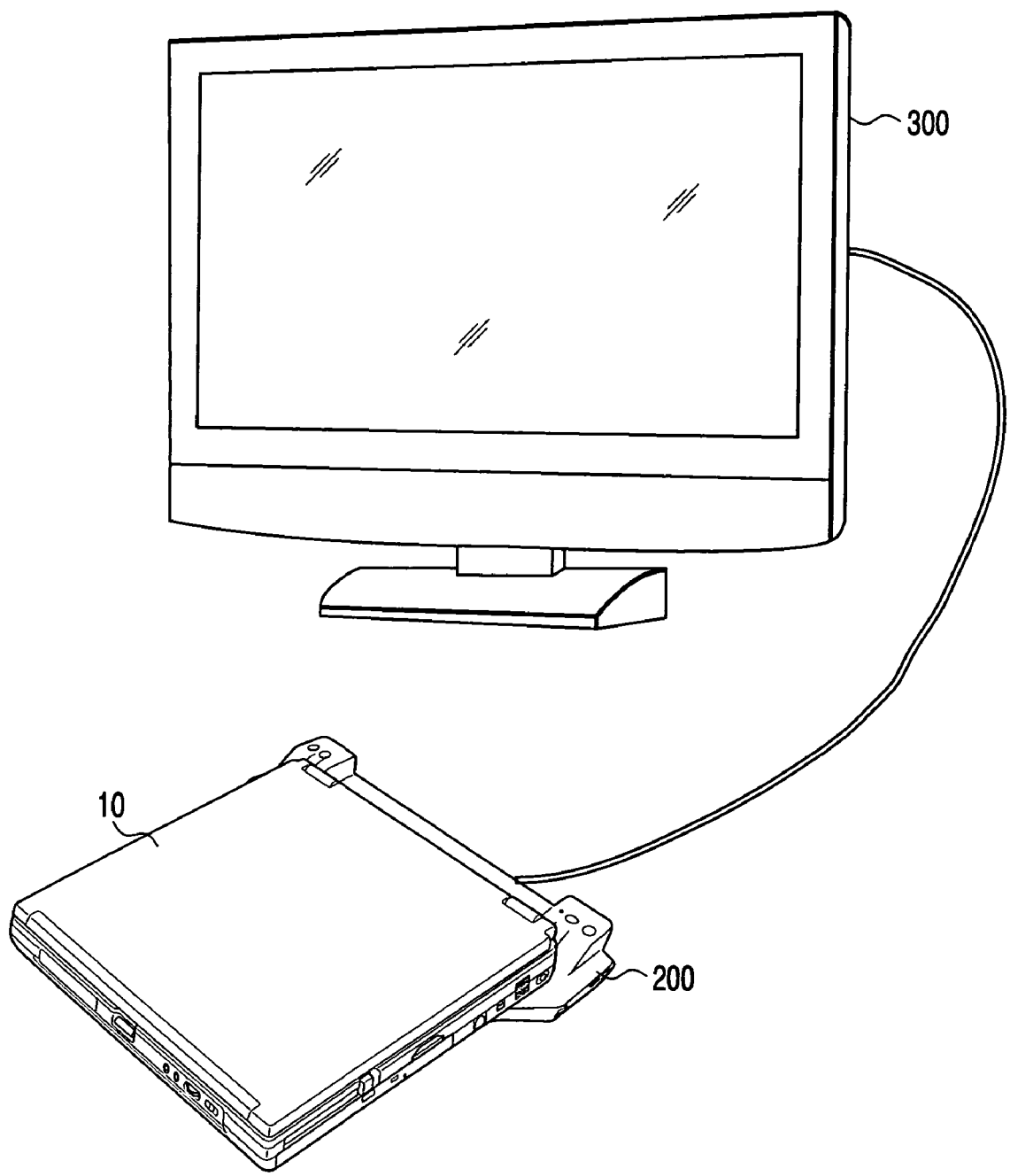
FIG. 4 is an exemplary view showing a state where the computer is installed on the docking station and the output image of the computer is allowed to be output on an external display.

As shown in FIG. 4, when the computer 10 is installed on the docking station 200, the docking station 200 is connected via a DVI cable to an external display 300 complying with the HDCP (High-bandwidth Digital Content Protection) standard serving as an external display unit, which enables the images created by the computer 10 to be displayed on the external display 300.

Next, referring to FIG. 5, the system configuration of the computer 10, docking station 200, and external display 300 will be explained.

As shown in FIG. 2, the computer comprises a CPU 111, a North Bridge 112, a main memory 113, a GPU (Graphics Processing Unit) 114, a South Bridge 119, a TV tuner 120 acting as a receiving section for receiving broadcast program data, a BIOS-ROM 120, a hard disk drive (HDD) 122, an embedded controller/keyboard controller (EC/KBC) IC 124, a LAN controller 126, and an I/O controller 127.

The CPU 111, which is a processor for controlling the operation of the computer 10, executes an operating system (OS) and various application programs loaded from the hard disk drive 122 into the main memory 113.

The CPU 111 also executes a BIOS (Basic Input Output System) program stored in the BIOS-ROM 120. The BIOS-ROM 120 is a program for hardware control.

The North Bridge 112 is a bridge device for connecting a local bus of the CPU 111 with the South Bridge 119. The North Bridge 112 has a memory controller for performing access control of the main memory 113. In addition, the North Bridge 112 has the function of communicating with the GPU 114 via an AGP (Accelerated Graphics Port) bus or the like.

The GPU 114 is a display controller for controlling the LCD 17 used as a display monitor of the computer 10 or the external display 300. The GPU 114, which has a video memory (VRAM), generates, from the display data written in the video memory by the OS/application programs, a video signal for forming display images to be displayed on the LCD 17 of the display unit 12 or the external display 300.

The GPU 114 has a coder 115 for encrypting video data to follow the HDCP (High-bandwidth Digital Content Protection) standard. The coder 115 has a first key ROM 116 in which a plurality of encryption keys to encrypt video data.

The South Bridge 119, which controls each device on an LPC (Low Pin Count) bus, includes an IDE (Integrated Drive Electronics) controller, a PCI (Peripheral Component Interconnect) controller, and a USB controller which are for controlling the hard disk drive (HDD) 122 and optical disk drive (ODD) 123.

The optical disk drive 123 is a drive unit for driving storage media, including a DVD and a CD. In addition, the optical disk drive 123 is a drive unit which writes data into an additionally writable optical medium, such as a CD-R or a DVD-R, and writes/erases data into/from a rewritable optical medium, such as a CD-RW, a DVD-RW, or a DVD-RAM.

The LAN controller 126 for exchanging data with a device connected a network is connected via a PCI bus to the South Bridge 119.

The EC/KBC 124 is a one-chip microcomputer into which an embedded controller for power management and a keyboard controller for controlling the keyboard (KB) 13 and the touch pad 16 are integrated. The EC/KBC 124 has the function of turning on/off the power supply of the computer 10 according to the user's operation of the power button 14 by operating in cooperation with a power supply controller.

The EC/KBC 124 can detect the state (locked/unlocked) of the lock mechanism 207.

The I/O controller 127 has the function of exchanging data with a device conforming to the IEEE 1284 standard.

The external display 300 includes a decoder 301 for decoding the video signal encrypted by the coder 115, a second key ROM 302 which stores an encryption key for decrypting the video signal, and an EEPROM 303 which stores device information, including the resolution of the display conforming to the DDC (Display Data Channel) standard and the refresh rate.

The docking station 200 has the function of transferring a video signal from the coder 115 to the decoder 301 of the external display 300, the function of transferring a control signal between the coder 115 and the decoder 301, an I2C bus for transferring display information stored in the EEPROM 303 to the EC/KBC 124 according to the DDC standard, a PS/2 connector 202 to which a keyboard/mouse is to be connected, a USB connector 203, a DVI connector 204, a LAN connector 206 which is connected to the LAN controller 126 and into which one end of a LAN cable is inserted, and a parallel connector 205 to which the I/O controller 127 is connected and into which one end of a cable complying with the IEEE 1284 standard is inserted.

In the computer 10, a Microsoft operating system 140 with a system power saving function known as ACPI (Advanced Configuration and Power Interface) has been installed. The ACPI function is effective not only for lengthening the battery driving time of a battery-powered notebook personal computer but also for reducing the AC power consumption of a desktop personal computer with no battery and performing its temperature control.

Figure 6:
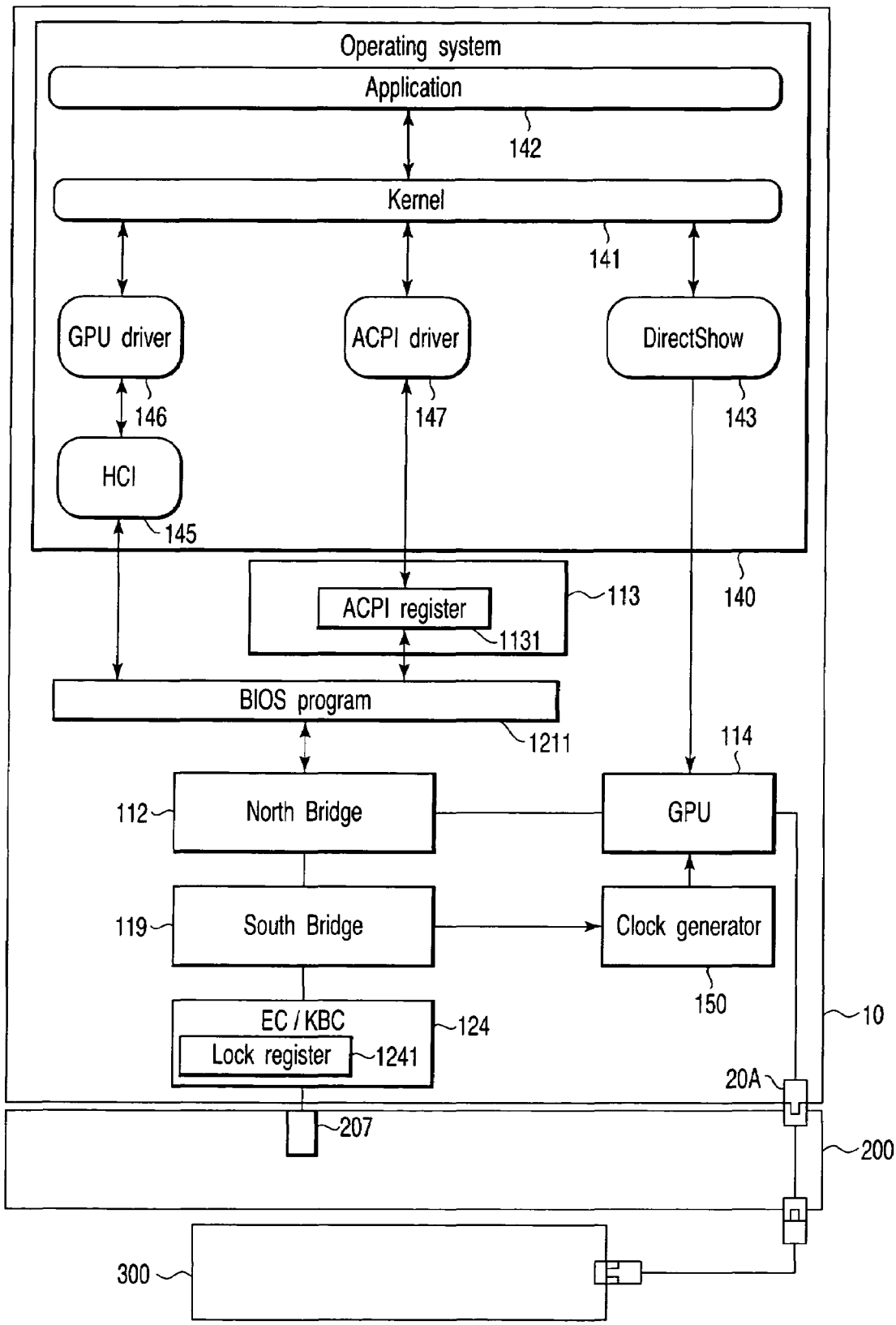
FIG. 6 is an exemplary block diagram to help explain ACPI and an external output function of the personal computer acting as an information processing apparatus of the embodiment.

FIG. 6 is a block diagram to help explain the ACPI and external output function of the personal computer acting as the information processing apparatus of the embodiment.

An application 142 on the operating system 140 accesses DirectShow 143 via a kernel 141 and generates a reproduced signal from MPG-2 data using the function of DirectShow 143. The reproduced signal is supplied from DirectShow 143 to the GPU 114. The GPU 114 encrypts the reproduced signal and outputs the encrypted signal to a video signal output port 20A included in the docking port 20.

When the computer 10 docks with the docking station 200, the EC/KBC 124 can detect the state of the lock mechanism 207. The EC/KBC 124 has a lock register 1241 into which the state of the lock mechanism 207 is to be written. The EC/KBC 124 has the function of, when the lock mechanism 207 is operated, informing a BIOS program 1211 via the South Bridge 119 and North Bridge 112 of the state of the lock mechanism 207. The BIOS program 1211 has the function of informing a GPU driver 146 for driving the GPU 114 via an HCI (Host Controller Interface) 145 of the state of the lock mechanism 207 informed by the EC/KBC 124. The GPU driver 146 has the function of, when the lock mechanism 207 is unlocked, requesting an ACPI driver 147 via the kernel 141 to stop the supply of a clock signal from a clock generator 150 to the GPU 114.

The ACPI driver 147 rewrites an ACPI register 1131 provided in the memory 113 to do setting so as to stop the supply of the clock signal to the GPU 114. The BIOS program 1211 has the function of enabling a clock supply stop signal supplied from the South Bridge 119 to the clock generator 150, when the ACPI register 1131 is rewritten to do setting so as to stop the supply of the clock signal to the GPU 114. The clock generator 150 has the function of stopping the supply of the clock signal to the GPU 114, when the clock supply stop signal is enabled.

Figure 7:
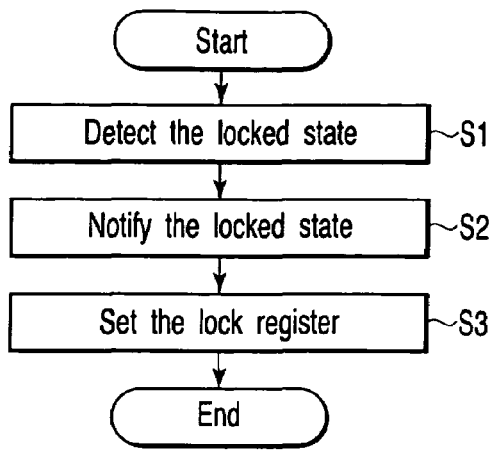
FIG. 7 is an exemplary flowchart to help explain the procedure for processing when the computer is installed on the docking station.

Referring to FIG. 7, the processing when the computer 10 is installed on the docking station 200 will be explained.

When the user installs the computer 10 on the docking station 200 connected to the external display 300, and locks the lock mechanism 207, thereby securing the computer 10 to the docking station 200, the EC/KBC 124 detects that the lock mechanism 207 is in the locked state (block S1). The EC/KBC 124 interrupts and informs the BIOS program 1211 that the lock mechanism has been locked (block S2). Moreover, the EC/KBC 124 writes in the lock register 1241 that the lock mechanism is in the locked state (block S3).

Figure 8:
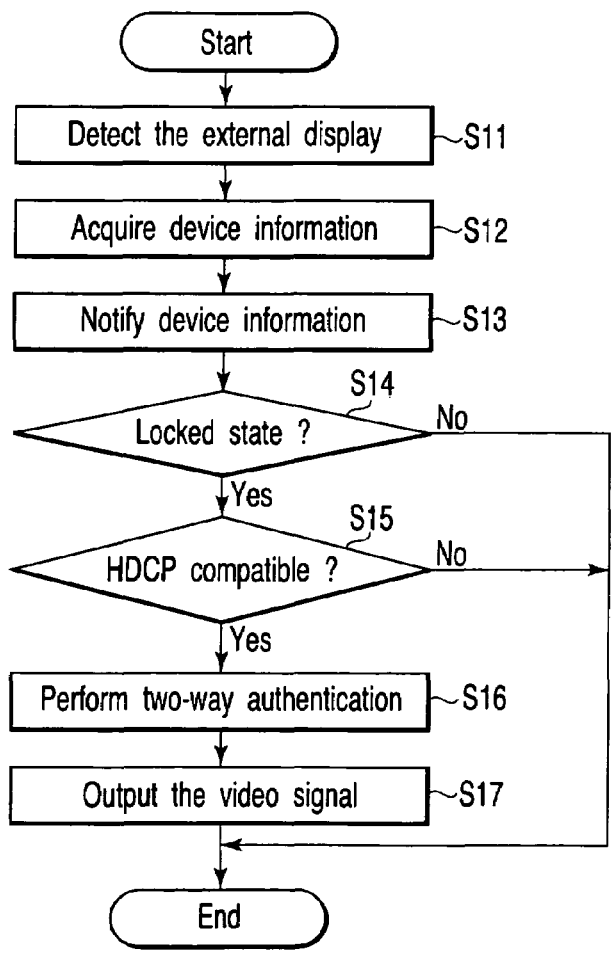
FIG. 8 is an exemplary flowchart to help explain the procedure for processing when an external display is detected and the protected content is output to the external display.

Next, the procedure for processing when the external display 300 is detected and the protected content is output to the external display 300 will be explained with reference to FIG. 8. The protected content (or video source) includes broadcast program data received by the TV tuner 120 or data reproduced from storage media by the optical disk drive 123.

If the power supply of the external display 300 is on, the EC/KBC 124 recognizes the external display 300 (block S11) and acquires device information on the external display 300 stored in the EEPROM 303 (block S12). The EC/KBC 124 interrupts and informs the GPU driver 146 via the HCI 145 of the acquired device information (block S13). The device information includes information about whether the external display 300 is compatible with the HDCP.

The GPU driver 146 determines whether the lock mechanism 207 is in the locked state, referring to the lock register 1241 (block S14). If the lock mechanism 207 is not in the locked state (No in block S14), the GPU driver 146 stops the output of the video signal.

If the lock mechanism 207 is in the locked state (Yes in block S14), the GPU driver 146 determines whether the external display 300 is compatible with the HDCP (block S15). If the external display 300 is not compatible with the HDCP (No in block S15), the GPU driver 146 ends the process.

If the external display 300 is compatible with the HDCP (Yes in block S15), the GPU driver 146 communicates with the GPU 114 and external display 300 using the encryption keys stored in the first key ROM 116 and second key ROM 302, thereby carrying out an authenticating process (block S16).

After the authenticating process, the GPU driver 146 permits the coder 115 to output the encrypted video signal to the decoder 301, thereby transferring the video signal (block S17).

As described above, with the lock mechanism 207 in the unlocked state, since the video signal is not output to the docking station 200, even if the computer 10 is removed from the docking station 200, the video signal is not output, with the result that there is no possibility that the video signal will be copied.

Figure 9:
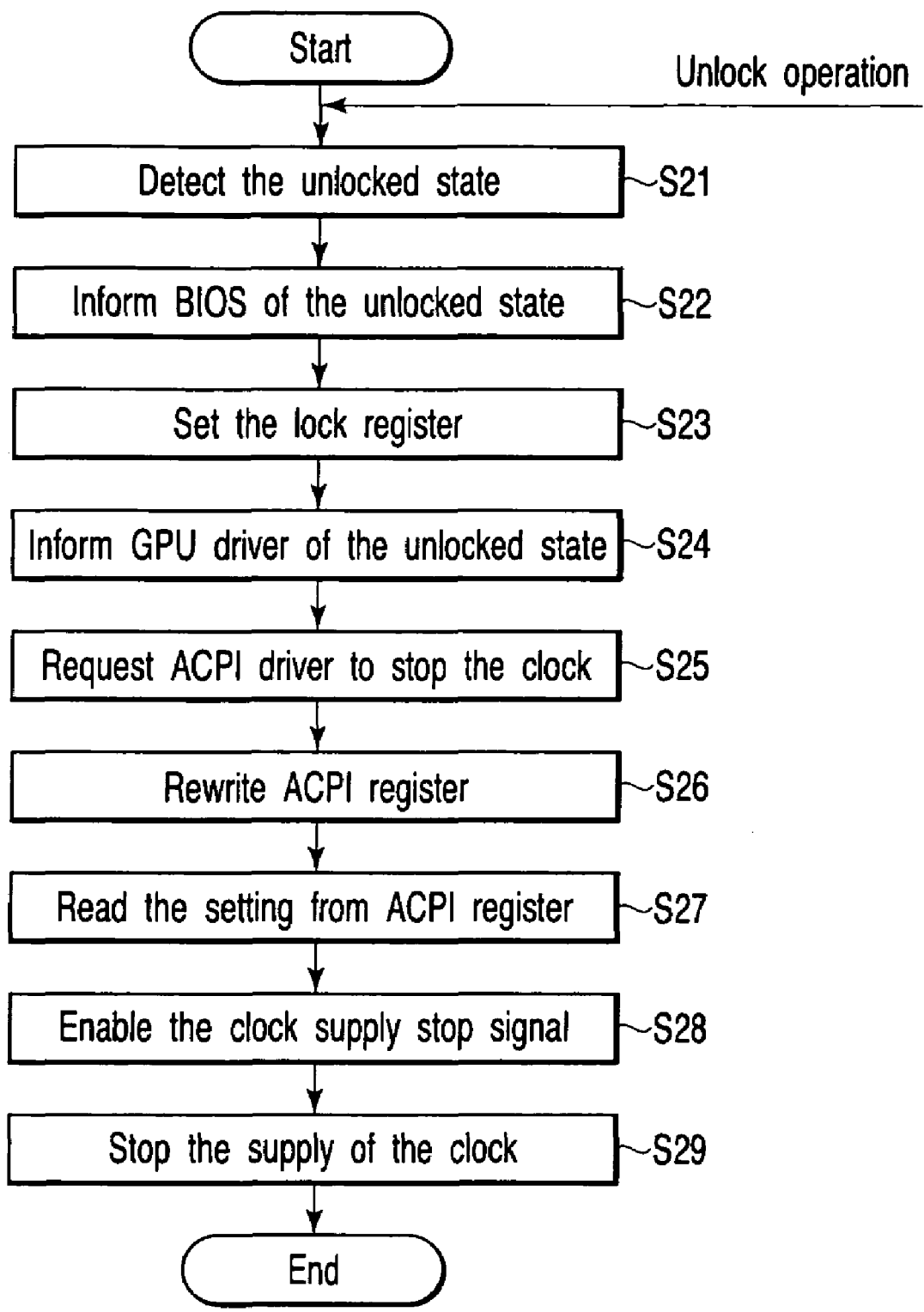
FIG. 9 is an exemplary flowchart to help explain the procedure for processing when the computer is removed from the docking station in the middle of outputting the encrypted video signal.

Next, the procedure for processing when the computer 10 is removed from the docking station 300 in the middle of outputting the encrypted video signal will be explained with reference to FIG. 9.

When the user unlocks the lock mechanism 207, the EC/KBC 124 detects that the lock mechanism 207 is in the unlocked state (block S21). The EC/KBC 124 interrupts and informs the BIOS program 1211 that the lock mechanism 207 has been brought into the unlocked state (block S22). The EC/KBC 124 writes in the lock register 1241 that the lock mechanism 207 is in the unlocked state (block S23). The BIOS program 1211 interrupts and informs the GPU driver 146 via the HCI 145 that the lock mechanism 207 has been brought into the unlocked sate (block S24). The GPU driver 146 requests the ACPI driver 147 via the kernel 141 to stop the supply of the clock to the GPU 114 (block S25). The ACPI driver 147 rewrites the ACPI register 1131 to do setting so as to stop the supply of the clock to the GPU 114 (block S26).

The BIOS program 1211 reads in the setting written in the ACPI register 1131 (block S27). The BIOS program 1211 instructs the South Bridge 119 via the North Bridge 112 to enable the clock supply stop signal supplied to the clock generator 150 (block S28).

The clock generator 150 detects that the clock supply stop signal has been enabled and stops the supply of the clock signal to the GPU 114 (block S29). The supply of the clock signal is stopped, preventing the GPU 114 from operating, which stops the video signal being output from the video signal output port 20A.

As described above, with the video signal being output, when the lock mechanism 207 goes into the unlocked state, this prevents the video signal from being output to the docking station 200. As a result, even if the computer 10 is removed from the docking station 200, there is no possibility that the video signal will be copied, because the video signal is not output.

Moreover, the supply of the driving voltage to the GPU 114 may be stopped to prevent the video signal from being output from the video signal output port 20A. In addition, the video signal may be prevented from being output from the video signal output port 20A by providing a switching element between the video signal output port 20A and the GPU 114 and controlling the switching element.

Figure 10:
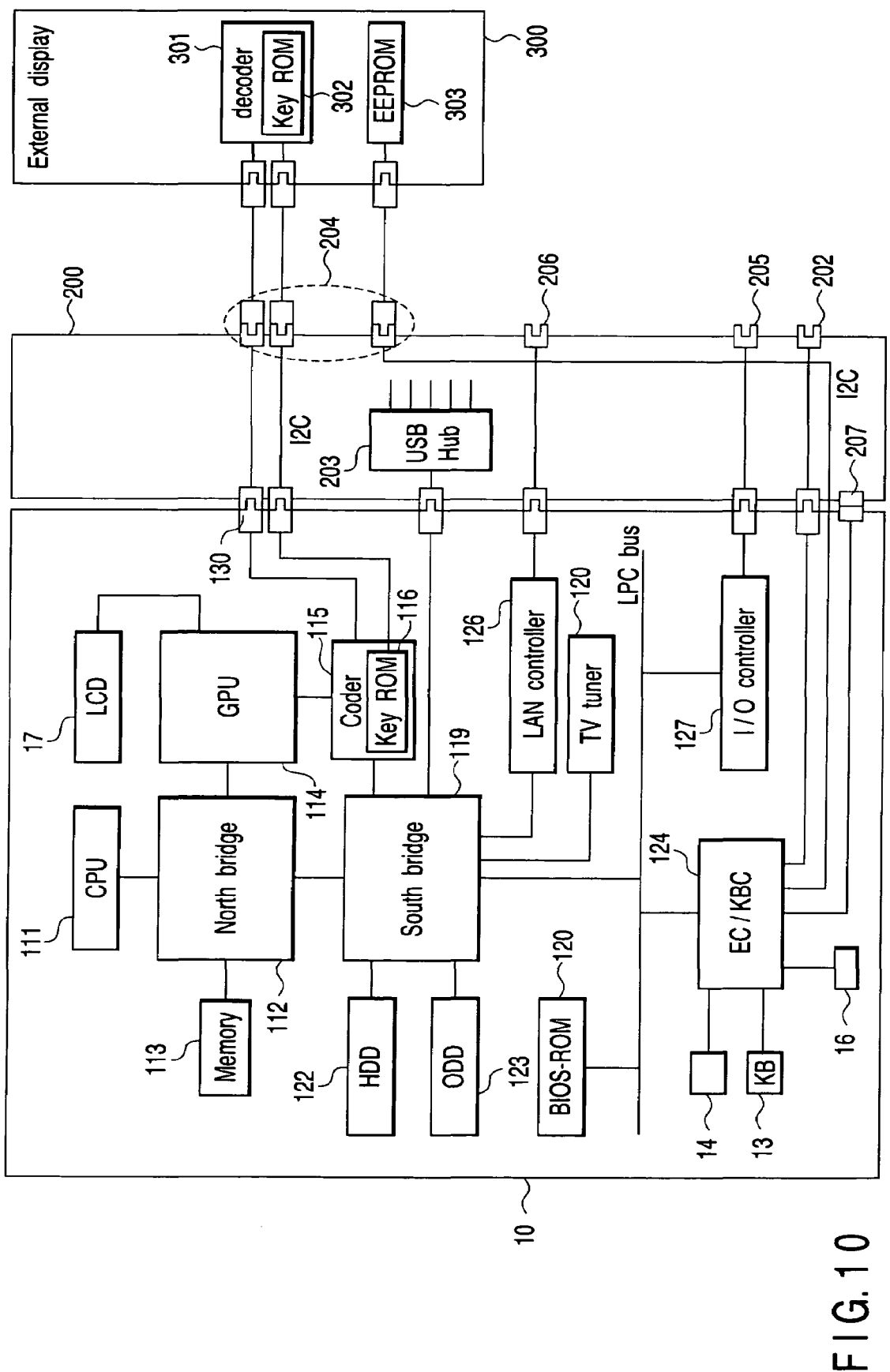
FIG. 10 is an exemplary view showing a modification of the system configuration of FIG. 5.

As shown in FIG. 10, the coder 115 and first key ROM 116 may not be included in the GPU 114. In this case, as for the low-speed control signal, an 8-bit parallel bus or UART may be used in place of the I2C signal.

In the case of the computer 10 using an external coder shown in FIG. 10, since its configuration has a greater risk than that of FIG. 5, it is conceivable that the configuration will also be applied to a case without the docking station. That is, in place of an undock event, a signal indicating that the enclosure of the computer 10 is opened (or open) may be used. Since the technique for detecting that the enclosure of the personal compute is opened has been known, an explanation and drawing of the technique will be omitted.

Figure 11:
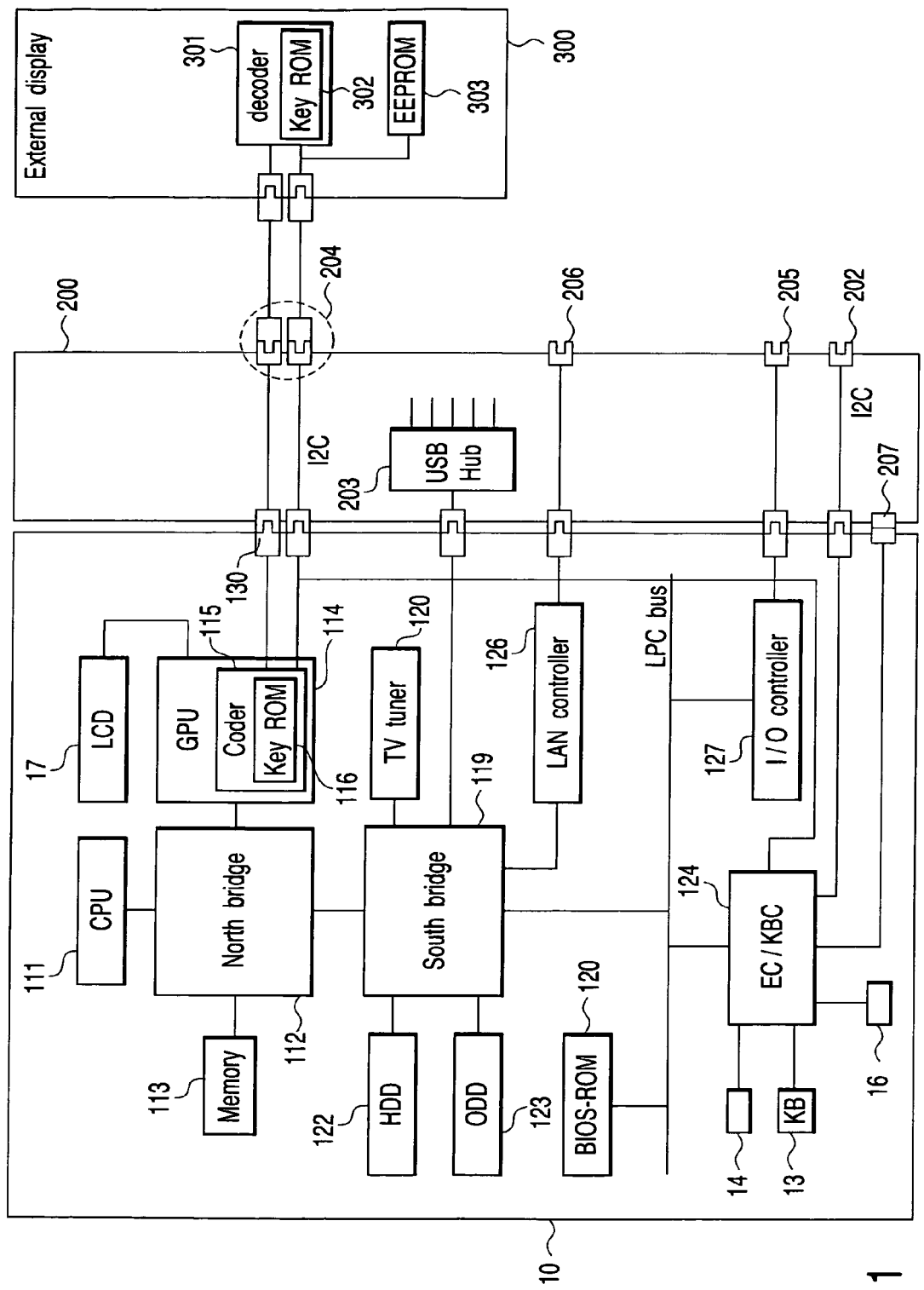
FIG. 11 is an exemplary view showing another modification of the system configuration of FIG. 5.

While in the configuration of FIG. 5, two independent I2C buses have been provided, they may be integrated into one bus as shown in FIG. 11. In that case, it is necessary to make sure that the bus transfer speed is sufficiently fast for the control signals and the like.

In FIG. 5, since the docking station 200 is originally provided with a mechanism and a circuit which generate an undock event, use of the mechanism and circuit makes it possible to detect that the connection between the notebook personal computer 10 and the docking station 200 is killed. Similarly, means for detecting the connection between the docking station 200 and the external display 300 is killed has also been prepared in the standard specifications. In the case of the configuration of FIG. 5, there is a DVI_detect signal as one of the DVI signals. The GPU 114 detects the DVI_detect signal, thereby informing the BIOS-ROM 120 that the external display unit has been removed. Therefore, in this case, too, it is possible to process an undock event.

While the above-described computer has the DVI connector 204 and has been capable of outputting a signal conforming to the DVI standard, the computer may be provided with an HDMI connector in place of the DVI connector so as to be capable of outputting a signal conforming to the DVI standard.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a body configured to be locked to an external unit by a lock mechanism;
   a port provided on the body and configured to output a video signal to the external unit;
   a display controller, provided in the body, that generates the video signal, and is configured to output the video signal to the port; and
   a control section configured to stop outputting the video signal generated by the display controller from the port to the external unit, when the lock mechanism is in the unlocked state.

2. The information processing apparatus according to claim 1, wherein the display controller is to output an encrypted video signal.

3. The information processing apparatus according to claim 2, wherein the encrypted video signal is a video signal encrypted according to the HDCP standard.

4. The information processing apparatus according to claim 1, wherein the control section performs control in such a manner that a state where the video signal is output to the external unit is shifted to a state where the output of the video signal to the external unit is stopped, when the lock mechanism state is shifted from the locked state to the unlocked state.

5. The information processing apparatus according to claim 1, wherein the video signal is supplied according to the DVI standard or HDMI standard.

6. An information processing apparatus comprising:
   a body configured to be locked by a lock mechanism to an external unit that is configured to output a video signal to an external display unit with a decoder to decode based on an encryption key;
   a display controller which is provided in the body and configured to generate a video signal encrypted based on the encryption key; and
   a control section configured to output the video signal generated by the display controller to the external unit, when the lock mechanism is in the unlocked state.

7. The information processing apparatus according to claim 6, wherein the video signal is a video signal encrypted according to the HDCP standard.

8. The information processing apparatus according to claim 6, wherein the control section controls in such a manner that a state where the video signal is output to the external unit is changed to a state where the output of the video signal to the external unit is stopped, when the lock mechanism state is shifted from the locked state to the unlocked state.

9. The information processing apparatus according to claim 8, wherein the video signal is supplied according to the DVI standard or HDMI standard.

10. A video signal output control method in an information processing apparatus configured to be locked to an external unit by a lock mechanism, the video signal output control method comprising:
    detecting the state of the lock mechanism; and
    stopping the output of the video signal to the external unit, when the lock mechanism is in the unlocked state.

11. The video signal output control method according to claim 10, wherein the video signal is encrypted.

12. The video signal output control method according to claim 11, wherein the encrypted video signal is a video signal encrypted according to the HDCP standard.

13. The video signal output control method according to claim 10, wherein the video signal is supplied according to the DVI standard or HDMI standard.

14. The video signal output control method according to claim 10; wherein a state where the video signal is output to the external unit is shifted to a state where the output of the video signal to the external unit is stopped, when the lock mechanism state is shifted from the locked state to the unlocked state.

\* \* \* \* \*